United States Patent
Kolagatla et al.

(10) Patent No.: US 10,241,808 B2
(45) Date of Patent: Mar. 26, 2019

(54) DETERMINING TEST APPLICATION EFFECTIVENESS

(71) Applicant: HEWLETT PACKARD ENTERPRISE DEVELOPMENT LP, Houston, TX (US)

(72) Inventors: Millikarjuna Reddy Kolagatla, Bangalore (IN); Narasimhamurthy M R, Bangalore (IN); Padmini R, Bangalore (IN); Narayana Rao SVN, Bangalore (IN)

(73) Assignee: ENTIT SOFTWARE LLC, Sunnyvale, CA (US)

(*) Notice: Subject to any disclaimer, the term of this patent is extended or adjusted under 35 U.S.C. 154(b) by 0 days.

(21) Appl. No.: 15/512,900

(22) PCT Filed: Nov. 26, 2014

(86) PCT No.: PCT/US2014/067519
§ 371 (c)(1),
(2) Date: Mar. 21, 2017

(87) PCT Pub. No.: WO2016/048395
PCT Pub. Date: Mar. 31, 2016

(65) Prior Publication Data
US 2017/0293548 A1    Oct. 12, 2017

(30) Foreign Application Priority Data
Sep. 26, 2014   (IN) ........................... 4752/CHE/2014

(51) Int. Cl.
*G06F 11/36* (2006.01)
*G06F 9/451* (2018.01)

(52) U.S. Cl.
CPC .......... *G06F 9/451* (2018.02); *G06F 11/3664* (2013.01); *G06F 11/3672* (2013.01); *G06F 11/3676* (2013.01)

(58) Field of Classification Search
None
See application file for complete search history.

(56) References Cited

U.S. PATENT DOCUMENTS 6,662,217 B1   12/2003  Godfrey et al.
8,627,287 B2    1/2014  Fanning et al.
(Continued)

FOREIGN PATENT DOCUMENTS

RU    2032989 C1    4/1995

OTHER PUBLICATIONS

Farooq et al, "Evaluating Effectiveness of Software Testing Techniques With Emphasis on Enhancing Software Reliability", vol. 2, No. 12, ISSN 2079-8407 Journal of Emerging Trends in Computing and Information Sciences © 2009-2011 CIS Journal, Dec. 2011.*
(Continued)

*Primary Examiner* — Philip Wang (57) ABSTRACT

In one example of the disclosure, a graphic user interface is provided and a plurality of factors to be considered by a user in evaluating a test application are caused to be displayed via the interface. The test application to test a software program. User-assigned ratings for test application evaluation factors are received via the interface. The test application evaluation factors include a documentation test quality factor, a product-general test quality factor, a product-specific test quality factor, and a defect seventy factor. An overall test effectiveness rating for the test application is determined based upon the ratings.

15 Claims, 10 Drawing Sheets

(56) References Cited

U.S. PATENT DOCUMENTS

| | | |
|---|---|---|
| 2005/0081104 A1 | 4/2005 | Nikolik |
| 2009/0228789 A1* | 9/2009 | Brugler .............. G06F 11/3612 |
| | | 715/700 |
| 2010/0269100 A1 | 10/2010 | King et al. |
| 2011/0197176 A1* | 8/2011 | Muharsky ........... G06F 11/3672 |
| | | 717/113 |
| 2012/0054551 A1 | 3/2012 | Gao et al. |
| 2012/0210209 A1 | 8/2012 | Biddle |
| 2012/0222018 A1* | 8/2012 | Lopian ................ G06F 11/3636 |
| | | 717/131 |
| 2013/0024844 A1* | 1/2013 | Bienkowski ........ G06F 11/3688 |
| | | 717/125 |
| 2013/0152047 A1 | 6/2013 | Moorthi et al. |
| 2017/0075790 A1* | 3/2017 | Macleod ............. G06F 11/3664 |
| 2017/0192875 A1* | 7/2017 | Shani ................. G06F 11/3608 |

OTHER PUBLICATIONS

Amyot, D., et al., "UCM-based Generation of Test Goals," May 12, 2014, 17 pages, available at http://lotos.csi.uottawa.ca/ucm/pub/UCM/VirLibWitul04/WITUL04.pdf.

International Search Report & Written Opinion received in PCT Application No. PCT/US2014/067519, dated Jun. 26, 2015, 9 pages.

Jeevarathinam, R. et al., "Apriori Based Approach for Software Specification Mining," Nov. 2009, 5 pages, available at http://ijrte.academypublisher.com/vol02/no03/ijrte02037377.pdf.

Yuri Chernak, "Validating and Improving Test-Case Effectiveness", IEEE Software, Jan./Feb. 2001, 6 pages.

\* cited by examiner

| Test Application Documentation Factors | | | | Test Application Product Factors | | | | | |
|---|---|---|---|---|---|---|---|---|---|
| | | | | Product General Factors | | | Product Specific Factors | | Defect Severity |
| Does this TC have a unique goal 722 | Is TC title self-explanatory 724 | Does the TC have clear steps with exact commands &/or a test data set 728 | Does the TC have expected results of behaviors clearly defined for each step 728 | Install filesets 730 | Un-install filesets 732 | Use case execute 734 | Internal or Local 736 | Create links for /view /cgi and cgis files 738 | Verify no errors in listed program functions, classes, libraries, or objects 740 |
| Assign the Product Factor Weightage ----> | "select" | "select" | "select" | High | High | High | High | High | High |
| Test App 1 "yes" | "select" | "select" | "select" | "high" | "select" | "select" | "select" | "select" | Critical |
| Test App 2 "select" | "select" | "select" | "select" | "select" | "select" | "select" | "select" | "select" | Serious |
| Test App 3 "select" | "select" | "select" | "select" | "select" | "select" | "select" | "select" | "select" | Low |
| Test App 4 "select" | "select" | "select" | "select" | "select" | "select" | "select" | "select" | "select" | Serious |
| Test App 5 "select" | "select" | "select" | "select" | "select" | "select" | "select" | "select" | "select" | Medium |

FIG. 7

| "Yes" marked for clarity in | Test Application Documentation Factor Effectiveness ("TADFE") |
|---|---|
| TA Goal, TA Title, TA Steps, TA Exp Behavior | E — 804 |
| (1 of Goal or Title) AND Steps, Exp Behavior | G |
| Goal, Title AND (1 of steps or Exp Behavior) — 808 | A — 806 |
| (1 of Goal or Title) AND (1 of steps or Exp Behavior) | A |
| (None of Goal or Title) AND Steps, Exp Behavior | A |
| Goal, Title AND (None of Steps, Exp Behavior) | P |
| 1 or none of Goal, Title, steps Exp Behavior | P |

| Test Application Product Factor Effectiveness ("TAPFE") - Stage1 | Product Factor Weightage | | |
|---|---|---|---|
| User-Assigned Ratings | High | Med | Low |
| High | E | G | A |
| Med | G | A | P |
| Low | P | P | P |

FIG. 8B

| TAPFE / Stage2 | TAPFE - Stage1 Outcome | | | |
|---|---|---|---|---|
|  | E | G | A | P |
| "No" for both Negative Case and Corner Case | E | G | A | P |
| "Yes" for both Negative Case and Corner Case | A | P | P | P |
| "No" for only 1 of Negative Case or Corner Case | G | A | P | P |

| Overall TC Effectiveness | TCPFE | | | |
|---|---|---|---|---|
| TADFE | E | G | A | P |
| E/G | DS C/S E<br>DS - M: G<br>DS - L: A | DS - C/S: G<br>DS - M/L: A | DS - C/S/M: A<br>DS - L: P | DS - C/S: A<br>DS - M/L: P |
| A | DS - C/S: A<br>DS - M/L: P | DS - C/S: A<br>DS - M/L: P | DS - C/S: A<br>DS - M/L: P | DS - C: A<br>DS - S/M/L: P |
| P | P | P | P | P |

FIG. 9B

| | TADFE | TAPFE | Overall TE | TCA | Improvement Priority |
|---|---|---|---|---|---|
| | P | E/G | | | H (Alert) |
| | A/P | A/P | | | M |
| | A/P | A/P | | | L |
| | G | A/P | | | L |
| | A | E/G | | | H (Alert) |
| | A | E/G | | | M |
| | | | E | | NAR |
| | E/G | | G | | NAR |
| | E/G | | A/P | >=1H | NAR |
| | | | | | L |
| Threshold Improvement Rating = "M" | | | | | |

All Test Applications - Overall Effectiveness

| | # of TAs | % of TAs | TA Gen. Factor Effectiveness | | TA Prod. Factor Effectiveness | |
|---|---|---|---|---|---|---|
| | | | # of TAs | % of TAs | # of TAs | % of TAs |
| Excellent | 85 | 14.5% | 180 | 30.7% | 451 | 77.0% |
| Good | 72 | 12.3% | 15 | 2.6% | 108 | 18.4% |
| Average | 76 | 13.0% | 135 | 23.0% | 4 | 0.7% |
| Poor | 352 | 60.1% | 245 | 41.8% | 23 | 3.9% |

TA User Ratings

| Summary | # of TAs | % of TAs |
|---|---|---|
| Lacking Unique Goal or Clarity in Title or Both | 59 | 10.1% |
| Missing Exact Steps or Expected Behavior | 389 | 66.4% |
| Corner Cases | 42 | 7.2% |
| Negative Cases | 83 | 14.2% |
| Use Cases | 72 | 12.3% |

Alerts for TA Areas Needing Attention

| Product Factor Weightage | Areas Missing Tests | Areas Under Focused |
|---|---|---|
| High | 5 | 6 |
| Medium | 8 | 8 |
| Low | 38 | 7 |

Improvement Priority Ratings

| | # of TAs | % of TAs |
|---|---|---|
| High (Alert) | 294 | 50.2% |
| Medium | 82 | 14.0% |
| Low | 6 | 1.0% |
| NAR | 192 | 32.8% |

Overall Effectiveness Rating for Subject Test Application: Excellent

FIG. 10

DETERMINING TEST APPLICATION EFFECTIVENESS

BACKGROUND

Software testing is an investigation into the performance or quality of a software program product, or a service provided via a software program, for the purpose of providing feedback for developers and other stakeholders for the software program. Such testing can provide such stakeholders with an objective, independent view of the strengths, weaknesses, and value of the software. Further, such testing can provide stakeholders with an understanding of the risks of software implementation, e.g., risks that a software failure may present to software users and stakeholders.

DETAILED DESCRIPTION

Introduction

In software testing, typically a test application is executed to attempt to execute or interact with the subject software program with the intent of identifying errors and defects. The test application may be utilized to test the software program in various testing modes or approaches, including, but not limited to, installation testing, smoke testing, sanity testing, acceptance testing, regression testing, alpha testing, beta testing, usability testing, accessibility testing, security testing, functional testing, and destructive testing.

It is important then, for software developers, test teams, and other stakeholders to have confidence that the test application utilized to evaluate the subject program is an effective and objective test application. However, evaluating and choosing between test application options is not a trivial task. It is common that identification or selection of a test application is based on expertise an individual or few individuals might have within a development or test team, rather than a well-defined methodology. Further, existing methodologies for evaluating test applications may evaluate a test application's effectiveness post-execution, e.g., by analyzing after execution of the test application with respect to a subject software program, the test application's ability to touch all of the code segments of the subject software program. As delays in identifying deficiencies in the design or performance of a test applications can have a significant negative impact upon a development project, existing methodologies for evaluating test applications after development and execution of the test application can be unsatisfactory in some situations.

To address these issues, various examples described in more detail below provide a system and a method to determine test application effectiveness. In one example of the disclosure, a graphic user interface is provided. A set of factors to be considered by a user in evaluating a test application, the test application to test a software program, are caused to be displayed via the interface. User-assigned ratings for test application evaluation factors, including a documentation test quality factor, a product-general test quality factor, a product-specific test quality factor, and a defect severity factor, are received via the interface. An overall test effectiveness rating for the test application is determined based upon the ratings.

In this manner, examples described herein may present an automated and efficient manner for application development and test teams and other stakeholders to determine effectiveness of test applications. Examples described herein will enable stakeholders to identify and track, prior to execution of the test application, a set of aspects to be considered in deriving the effectiveness of the test application. Disclosed examples will provide stakeholders with objective feedback suggesting whether or not a test application has a high probability of detecting significant subject application errors early in the product development cycle.

Detecting significant severity faults early enables the developers to take better defect containment actions, which will in turn helps to stabilize the software product early in the cycle. This should significantly improve time to market and reduce the likelihood of need for an early-cycle product update. Further, examples provided herein enable a system and method that, where a set of test applications are being evaluated, can assign appropriate priorities for the test applications according to the effectiveness determinations. Thus, developers', test teams', and other stakeholders' satisfaction with test applications and the test application services that may incorporate the examples described herein should increase. Likewise, user satisfaction with software products and services that are tested with test applications evaluated in accordance with the disclosed examples should increase.

The following description is broken into sections. The first, labeled "Environment," describes an environment in which various examples may be implemented. The second section, labeled "Components," describes examples of various physical and logical components for implementing various examples. The third section, labeled "Operation," describes steps taken to implement various examples. The fourth section, labeled "Illustrative Example," presents an example of determining effectiveness of test applications.

Environment

Figure 1:
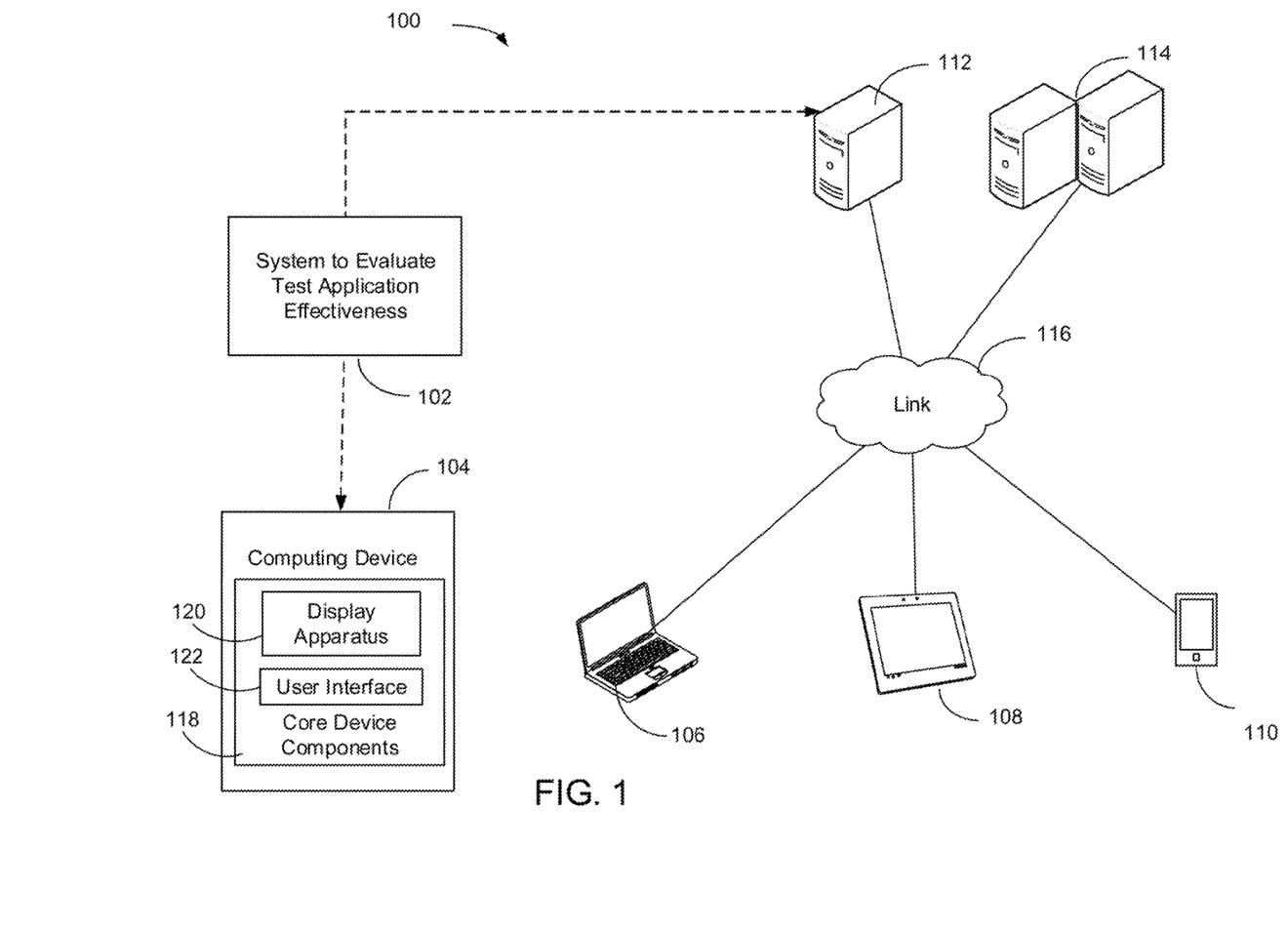
FIG. 1 is a block diagram depicting an example environment in which various examples of determination of test application effectiveness may be implemented.

FIG. 1 depicts an example environment 100 in which examples may be implemented as a system 102 to determine test application effectiveness. Environment 100 is shown to include computing device 104, client devices 106, 108, and 110, server device 112, and server devices 114. Components 104-114 are interconnected via link 116.

Link 116 represents generally any infrastructure or combination of infrastructures to enable an electronic connection, wireless connection, other connection, or combination thereof, to enable data communication between components 104, 106, 108, 110, 112, and 114. Such infrastructure or infrastructures may include, but are not limited to, one or more of a cable, wireless, fiber optic, or remote connections via telecommunication link, an infrared link, or a radio frequency link. For example, link 116 may represent the internet, one or more intranets, and any intermediate routers, switches, and other interfaces. As used herein an "electronic connection" refers generally to a transfer of data between components, e.g., between two computing devices, that are connected by an electrical conductor A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112, and/or server devices 114 via link 116. Server device 112 represents generally any computing device to serve an application and corresponding data for consumption by components 104-110. Server devices 114 represent generally a group of computing devices collectively to serve an application and corresponding data for consumption by components 104-110.

Computing device 104 represents generally any computing device with which a user may interact to communicate with client devices 106-110, server device 112, and/or server devices 114 via link 116. Computing device 104 is shown to include core device components 116. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

Components

Figure 2:
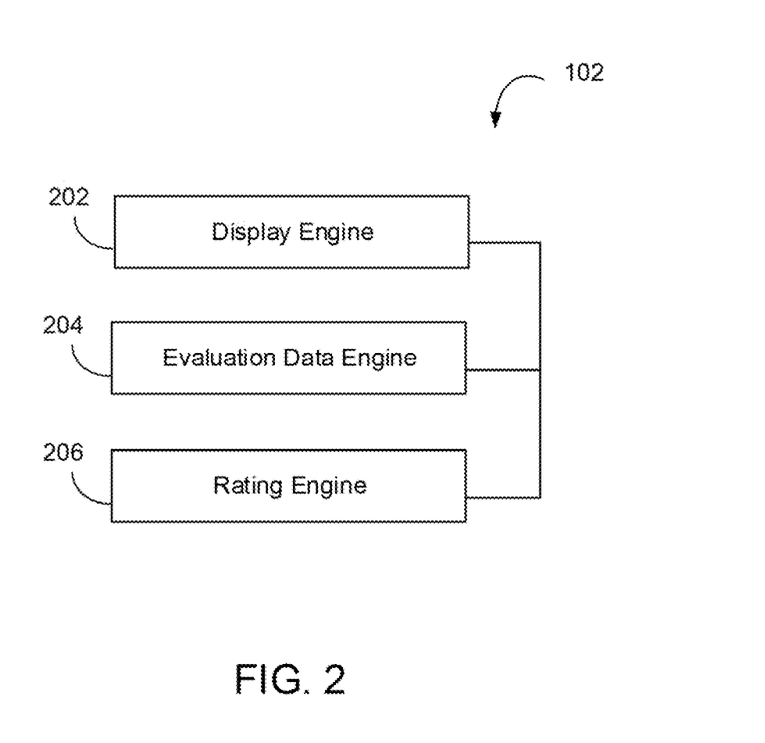
FIG. 2 is a block diagram depicting an example of a system to determine test application effectiveness based upon user-assigned ratings for test application factors including a documentation test quality factor, a product-general test quality factor, a product-specific test quality factor, and a defect severity factor.
Figure 3:
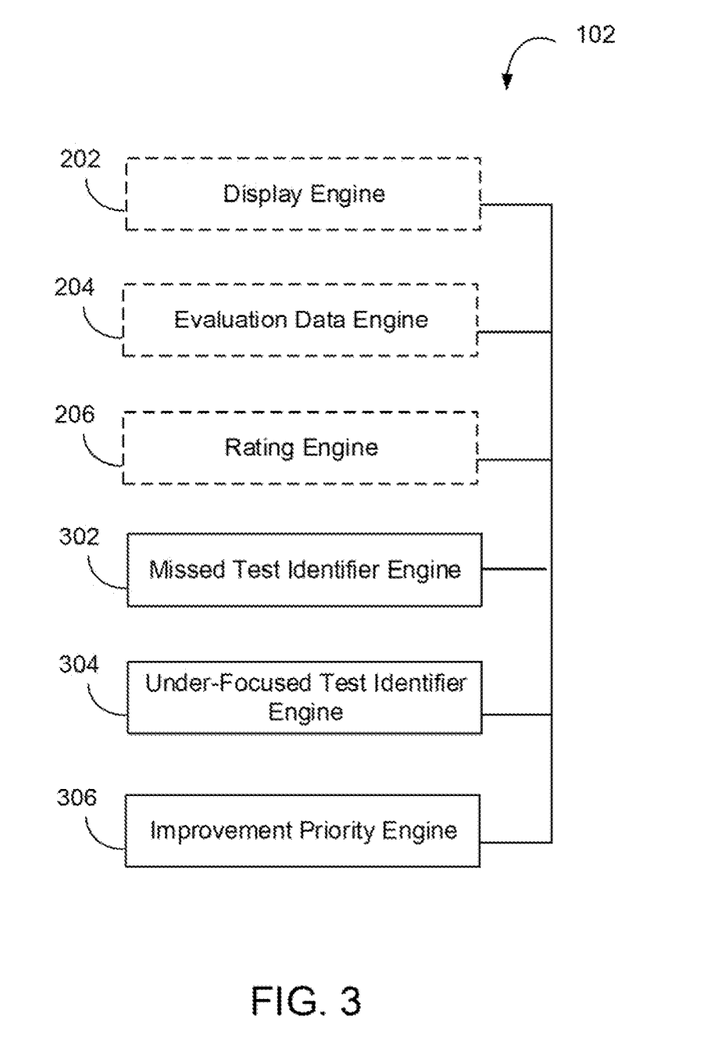
FIG. 3 is a block diagram depicting an example of a system to determine test application effectiveness and provide recommendations or alerts in certain missed test, under-focused test, and improvement priority circumstances.

FIGS. 2, 3, 4, and 5 depict examples of physical and logical components for implementing various examples. In FIGS. 2 and 3 various components are identified as engines 202, 204, 206, 302, 304, and 306. In describing engines 202, 204, 206, 302, 304, and 306 focus is on each engine's designated function. However, the term engine, as used herein, refers generally to a combination of hardware and programming to perform a designated function. As is illustrated later with respect to FIG. 5, the hardware of each engine, for example, may include one or both of a processor and a memory, while the programming may be code stored on that memory and executable by the processor to perform the designated function.

System 102, discussed in more detail below, represents generally a combination of hardware and programming to enable determination of test application effectiveness. In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. For example, components that implement providing a graphic user interface and causing a display of a set of factors to be considered by a user in evaluating a test application via the interface, and that implement receiving, via the interface, user-assigned ratings for test application evaluation factors including a documentation test quality factor, a product-general test quality factor, a product-specific test quality factor, and a defect severity factor, may be included within computing device 104. Continuing with this example, components that implement determining an overall test effectiveness rating for the test application based upon the ratings may be components included within a server device 112. Other distributions of system 102 across computing device 104, client devices 106-110, server device 112, and server devices 114 are possible and contemplated by this disclosure. It is noted that all or portions of system 102 to determine test application effectiveness may also be included on client devices 106, 108 or 110.

FIG. 2 is a block diagram depicting components of a system 102 to determine test application effectiveness. In this example, system 102 includes display engine 202, evaluation data engine 204, and rating engine 206, in performing their respective functions, engines 202, 204, and 206 may access a data repository 300 (FIG. 3). Repository 300 (FIG. 3) represents generally any memory accessible to system 102 that can be used to store and retrieve data.

In an example, display engine 202 represents generally a combination of hardware and programming to provide a graphic user interface, and cause a display of a set of factors to be considered by a user in evaluating a test application via the interface. The test application is an application to test a software program. As used herein, a "software program" refers generally to any web application, web program, firmware application, firmware program, software application, or any other written instructions that execute at a computing device. As used herein, a "test application" refers generally to a software application that is to provide information, for display or other communication to a user, regarding the quality of a software program, or service facilitated by a software program, under test (sometimes referred to herein as a "subject software program." In examples, test application techniques include, but are not limited to, the process of executing the subject software program for the purpose of identifying errors or other defects in the software program. As used herein, a graphic user interface, or "GUI", refers generally to any type of display caused by an application that can enable a user to interact with the application via visual properties of the display. As used herein, a "display" refers generally to an exhibition or presentation caused by a computer for the purpose of perception by a user. In an example, a display may be or include a GUI display to be presented at a computer monitor, touchscreen, or other electronic display device. In an example, display engine 202 may include such an electronic display device. In another example, display engine 202 may cause the display by sending the set of factors along with instructions for display to a display device that is electronically or, wirelessly connected to system 102.

Evaluation data, engine 204 represents generally a combination of hardware and programming to receive, via the GUI, user-assigned ratings for a set of test application evaluation factors. The set of test application factors is to include a documentation test quality factor, a product-general test quality factor, a product-specific test quality factor, and a defect seventy factor. As used herein, a "rating" refers generally to a ranking, score, grade, value, or other rating, measure, or assessment of performance or accomplishment. For instance, a rating of a test application factor may refer to a ranking, score, grade, value, or other rating, measure, or assessment of performance or accomplishment of a test application evaluation factor.

As used herein, a "documentation test quality factor" refers generally to an evaluation factor that evaluates or considers a state or quality of documentation for a test application. In examples, the rating for the documentation test quality factor may include a user-provided evaluation of an extent to which the test application documentation includes a stated goal for the test application, an explanatory title, stated test steps, and/or stated expected test results or behaviors.

As used herein, a "product-general test quality factor" refers generally to an evaluation factor that evaluates or considers how well a test application is focused on one or more product factors that are not specific to the subject software program. In examples, the rating for the product-general test quality factor may include an assessment of how well or the extent to which the test application examines, investigates, or otherwise tests the performance of the subject software program as the software program performs an installation task, an uninstallation task, a use case task, an internationalization task, and/or a localization task. In other examples, the rating for the product-general test quality factor may include an assessment of how well or the extent to which the test application examines, investigates, or otherwise tests the performance of the subject software program as the software program accesses certain file types, including but not limited to a document file, a log file, and/or a configuration file.

As used herein, a "product-specific test quality factor" refers generally to an evaluation factor that evaluates how well a test application is focused one or more product factors that are specific to the subject software program or a portion of the software program. In examples, the rating for the product-specific test quality factor includes an assessment of how well the test application examines, investigates, or otherwise tests the software program with respect to a named document, a named program function, a named program class, a named program library, and/or a named program object. As used herein, "named" refers generally to a name for the document, program function, program class, program library, or program object being stated, displayed, or otherwise identified in the display.

In examples, the rating for a defect severity factor is an evaluation factor that is an assessment via user input (e.g., marking the factor as "Critical", "Serious", "High", "Medium", "Low", etc.) of impact to a user or stakeholder if the test application indicates an unsatisfactory behavior of the software program In an example, the rating for the defect severity factor may indicate a significance to end users of the software program if there is a failure of the software program upon execution of the test application. In another example, the rating for the defect severity factor may indicate a significance to developer users, production team users, or other production stakeholder users if there is a failure of the software program upon execution of the test application.

Rating engine 206 represents generally a combination of hardware and programming to determine, based upon the ratings for the test application evaluation factors, an overall test effectiveness rating for the test application. In an example, rating engine 206 is to cause a display of the determined overall test effectiveness rating via a GUI, e.g., a dashboard GUI. In an example, rating engine 206 is to cause a display of the determined overall test effectiveness rating via the GUI that the display engine 202 provided and utilized to cause be display of the set of test application evaluation factors, and which evaluation data engine 204 utilized to receive the user-assigned ratings for the test application evaluation factors. In an example, the overall test effectiveness rating may be one among the set of "Excellent", "Good", "Average", and "Poor." In another example, the overall test effectiveness rating may be a numerical rating, e.g., "x" wherein is an integer and the maximum possible rating is "100." In yet another example, the overall test effectiveness rating may be expressed as a range of numbers (e.g., "a rating between "x and "y"), wherein "x" and "y" are integers and "y" has a value greater than "x").

In an example, evaluation data engine 204 may receive via the GUI, a user-assigned weightage rating for the product-general test quality factor and the product-specific test quality factor. As used herein, a "weightage rating" refers generally to a rating, descriptor, or value that indicates the relative importance or impact of an item in a group as compared to the other items in the group. In an example, the user-assigned weightage factor may be one of a set of "High", "Medium", and "Low" weightage factors chosen by a user pursuant to a drop down menu provided by the GUI. In this example, rating engine 206 is to determine the overall test effectiveness rating based in part upon the weightage rating.

In an example, evaluation data engine 204 may receive, via the GUI, a user-assigned designation of the type of test case represented by the test application. In an example, the designation of type of test case may be a user selection from one of a set of options that were presented to the user pursuant to a drop down menu provided by the GUI. In examples, the set of options presented to the user for selection of type of test case may include, but are not limited to a "Positive Case", a "Negative Case", a "Boundary Case", an "Edge Case", and or a "Corner Case"). In an example, the overall test effectiveness rating is determined based upon the designation. As used herein in describing a test application, a "positive case" refers generally to a test application designed to test a subject software program to confirm the software program when executed does what the software program is expected to do. As used herein in describing a test application, a "negative case" refers generally to a test application designed to test a subject software program to confirm the software program when executed does not do what the software program is not expected to do. As used herein in describing a test application, a "boundary case" refers generally to a test application designed to test a subject software program when a parameter or requirement is at or just beyond its maximum or minimum limits. As used herein in describing a test application, an "edge case" refers generally to a test application designed to test a subject software program at an extreme (maximum or minimum) operating parameter or requirement. As used herein in describing a test application, a "corner case" refers generally to a test application designed to test a subject software program according to parameters or requirements that occur outside of normal operating parameters or requirements.

FIG. 3 is a block diagram depicting components of a system 102 to determine test application effectiveness. In this example, system 102, in addition to display engine 202, evaluation data engine 204, and rating engine 206 discussed above, includes missed test identifier engine 302, under-focused test identifier engine 304, and improvement priority engine 306. In performing their respective functions, engines 302, 304, and 306 may access a data repository 300 (FIG. 3). Repository 300 (FIG. 3) represents generally any memory accessible to system 102 that can be used to store and retrieve data.

In an example, display engine 202 represents generally a combination of hardware and programming to provide a GUI, and cause a display of a set of factors to be considered by a user in evaluating a subject test application, the subject test application to test a software program, via the interface.

Evaluation data engine 204 represents generally a combination of hardware and programming to receive, via the GUI, user-assigned ratings for a set of test application evaluation factors including a documentation test quality factor, a product-general test quality factor, a product-specific test quality factor, and a defect severity factor.

Rating engine 206 represents generally a combination of hardware and programming to determine, based upon the ratings for the test application evaluation factors, an overall test effectiveness rating for the subject test application. In an example, rating engine 206 may cause a display of the determined overall test effectiveness rating via the GUI that is provided by display engine 202 and utilized to cause the display of the set of test application evaluation factors, and that is utilized by evaluation data engine 204 to receive the user-assigned ratings for the test application evaluation factors.

In an example, missed test identifier engine 302 represents generally a combination of hardware and programming to access data indicative of evaluation of a set of test applications relating to the software program, the set of test applications including the subject test application. Missed test identifier engine 302 provides a recommendation or alert responsive to determining that a product-general test quality factor or a product-specific test quality factor is not tested by any of the set of test applications. In an example, missed test identifier engine 302 causes a display of the missing test recommendation or alert via a GUI, e.g., a dashboard display GUI or any other GUI. In an example, missed test identifier engine 302 causes a display of the missing test recommendation or alert via the GUI that is provided by display engine 202 and utilized to cause the display of the set of test application evaluation factors, and that is utilized by evaluation data engine 204 to receive the user-assigned ratings for the test application evaluation factors.

Under-focused test identifier engine 304 represents generally a combination of hardware and programming to access data indicative of evaluation of a set of test applications relating to the software program, the set including the subject test application. In examples, the set of test applications accessed by under-focused test identifier engine 304 may, or may not be, the same set of test applications that is accessed by the missed test identifier engine 302. Under-focused test identifier engine 304 is to provide a recommendation or alert responsive to determining that a product-general test quality factor or a product-specific test quality factor is not directly tested by one of the set of test applications. As used herein, "not directly tested" refers generally to the product-general test quality factor or a product-specific test quality factor having received a user-rating that is below the median option for the factor among the options made available for user-selection. In an example, under-focused test identifier engine 304 causes a display of the under-focused recommendation or alert via a GUI, e.g., a dashboard display GUI or any other GUI. In an example, under-focused test identifier engine 304 causes a display of the under-focused recommendation or alert via the GUI that is provided by display engine 202 and utilized to cause the display of the set of test application evaluation factors, and that is utilized by evaluation data engine 204 to receive the user-assigned ratings for the test application evaluation factors.

Improvement priority engine 306 is to determine an improvement priority rating for the subject test application. Improvement priority engine 306 is to determine the improvement priority rating in consideration of at least two of the user-assigned documentation test quality factor rating, the user-assigned product-general test quality factor rating, the user-assigned product-specific test quality factor rating, the user-assigned defect severity factor rating, and the determined overall test effectiveness rating, and to provide a recommendation or alert responsive to determining the improvement priority rating exceeds a rating. For instance, if a test application has received a "Poor" rating for a documentation test quality factor, and an "Excellent" or "Good" rating for the product-general test quality factor and the product-specific test quality factor, the improvement priority rating may be determined as "High" (as the test application is aiming at an important functionality, but the test application documentation is poor). This scenario could lead to inappropriate or partial testing and hence possible defect slips, and hence is identified as having a "High" improvement priority, in an example, improvement priority engine 306 causes a display of the determined improvement priority rating recommendation or alert via a GUI, e.g., a dashboard display GUI or any other GUI. In an example, improvement priority engine 306 causes a display of the improvement priority recommendation or alert via the GUI that is provided by display engine 202 and utilized to cause the display of the set of test application evaluation factors, and that is utilized by evaluation data engine 204 to receive the user-assigned ratings for the test application evaluation factors.

Figure 4:
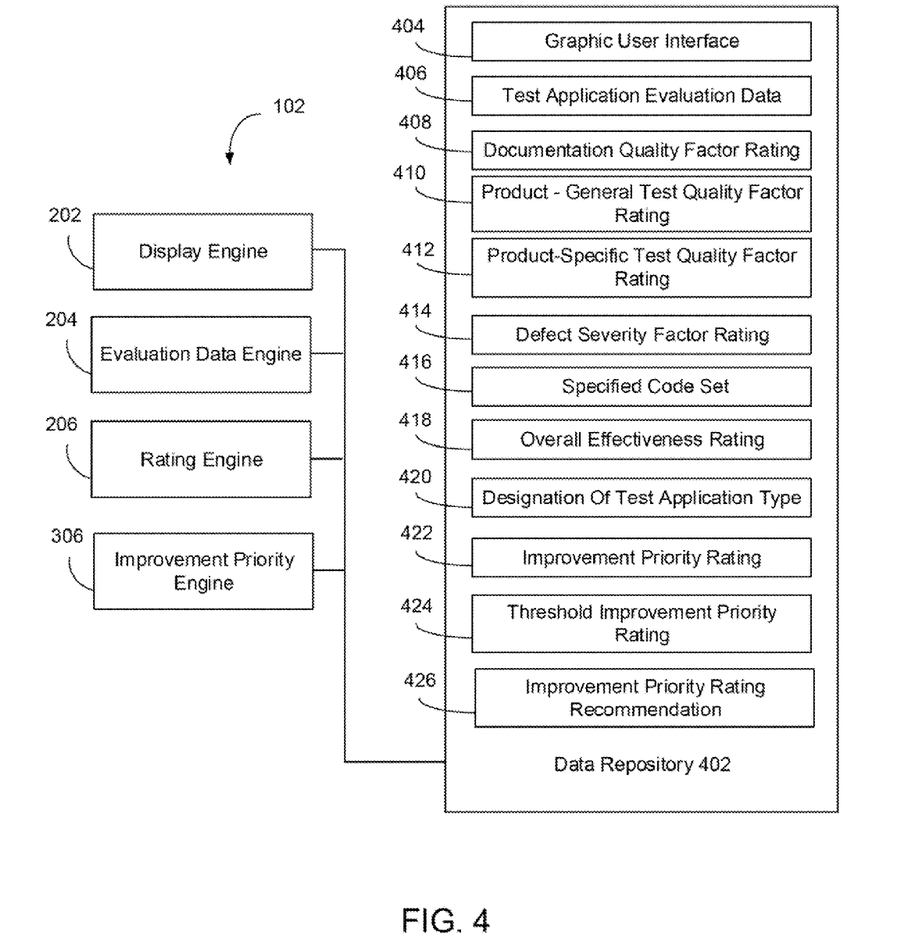
FIG. 4 is a black diagram depicting an example data structure for a system to determine test application effectiveness.

FIG. 4 depicts an example implementation of data repository 400. In this example, data repository 400 includes data representative of a graphic user interface 404, test application evaluation data 406, a documentation quality factor rating 408, a product-general test quality factor rating 410, a product-specific test quality factor rating 412, a defect severity factor rating 414, a specified code set 416, an overall effectiveness rating 418, an improvement priority rating 422, a threshold improvement priority rating 424, and an improvement priority rating recommendation 426. Referring to FIG. 4 in view of FIG. 2, in one example, display engine 202 supplies a GUI 404, and causes a display, via the GUI, of a documentation test quality factor, a product-general test quality factor, a product-specific test quality factor, and a defect severity factor for a test application. The test application is to test a software program, and the documentation test quality factor, the product-general test quality factor, the product-specific test quality factor, and the defect seventy factor are to be considered by a user in evaluating the test application via the GUI 404.

Evaluation data engine 206 receives, via the GUI 404, as test application evaluation data 406 for the application, a user-assigned rating for the documentation test quality factor 408 the product-general test quality factor 410, the product-specific test quality factor 412, and the defect severity factor 414.

In an example, the documentation test quality factor rating 408 may include an evaluation of an extent to which the test application documentation includes at least one of a stated goal for the test application, an explanatory title, stated test steps, and stated expected test results, or stated expected test behaviors. The product-general test quality factor rating 410 may include an assessment of the test application testing of at least of one of an installation task, an uninstallation task, a use case task, an internationalization task, and a localization task. The rating for the product-general test quality factor 412 may include an assessment of the test application testing a specified code set 416 of the test application, e.g., a named code subset, named code lines, a named program function, a named program class, a named program library, and/or a named program object.

Rating engine 208 determines, in consideration of the ratings, an overall test effectiveness rating 418 for the test application and causes a display of the ratings via the GUI 404.

Continuing with, the example data repository 400 of FIG. 4, in a particular example evaluation data engine 208 may also receive via the interface 404, a user-assigned designation of test application type 420 (e.g., a positive case, negative case, boundary case, edge case, and corner case), and rating engine 208 may determine the overall effectiveness rating 418 in consideration of the test application type 420.

Continuing with the example data repository 400 of FIG. 4, in an example, improvement priority engine 306 identifies a combination of at least two of the user-assigned documentation test quality factor rating 408, user-assigned product-general test quality factor rating 410, product-specific test quality factor rating 412, and defect severity factor rating 414. Improvement priority engine 306 determines an improvement priority rating 422 based upon the identified combination and the determined overall test effectiveness rating 418. Improvement priority engine 306 then accesses a threshold improvement priority rating 424 and compares the threshold improvement priority rating 424 to the determined improvement priority rating 422. In an example, improvement priority engine 306 provides an alert 426 via the GUI 404 responsive to determining the improvement priority rating 422 is above the threshold improvement priority rating 424.

In the foregoing discussion of FIGS. 2, 3, and 4, engines 202, 204, 206, 302, 304, and 306 were described as combinations of hardware and programming. Engines 202, 204, 206, 302, 304, and 306 may be it in a number of fashions. Looking at FIG. 5 the programming may be processor executable instructions stored on a tangible memory resource 502 and the hardware may include a processing resource 504 for executing those instructions. Thus memory resource 502 can be said to store program instructions that when executed by processing resource 504 implement system 102 of FIGS. 2, 3, and 4.

Figure 5:
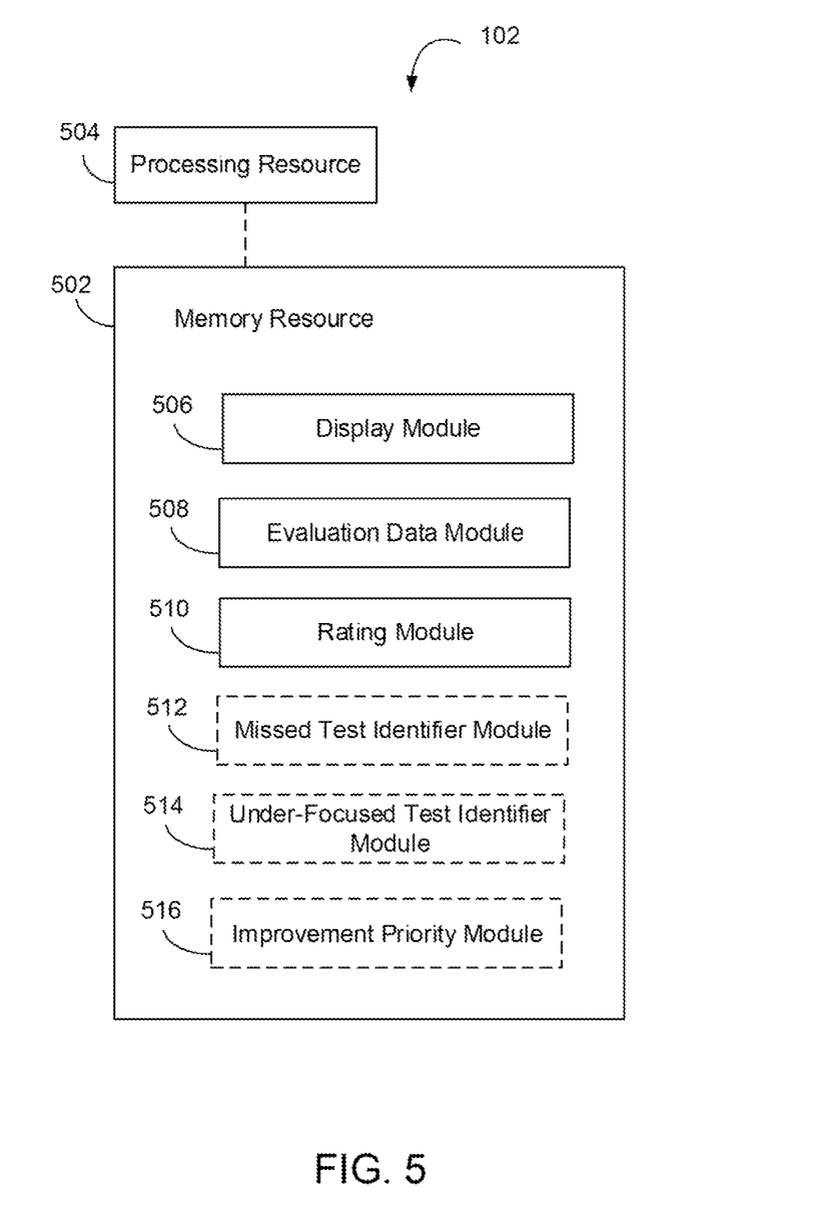
FIG. 5 is a block diagram depicting a memory resource and a processing resource, for implementing determination of test application effectiveness according to examples.

Memory resource 502 represents generally any number of memory components capable of storing instructions that can be executed by processing resource 504. Memory resource 502 is non-transitory in the sense that it does not encompass a transitory signal but instead is made up of more or more memory components to store the relevant instructions. Memory resource 502 may be implemented in a single device or distributed across devices. Likewise, processing resource 504 represents any number of processors capable of executing instructions stored by memory resource 502. Processing resource 504 may be integrated in a single device or distributed across devices. Further, memory resource 502 may be fully or partially integrated in the same device as processing resource 504, or it may be separate but accessible to that device and processing resource 504.

In one example, the program instructions can be part of an installation package that when installed can be executed by processing resource 504 to implement system 102. In this case, memory resource 502 may be a portable medium such as a CD, DVD, or flash drive or a memory maintained by a server from which the installation package can be downloaded and installed. In another example, the program instructions may be part of an application or applications already installed. Hem, memory resource 502 can include integrated memory such as a hard drive, solid state drive, or the like.

In FIG. 5, the executable program instructions stored in memory resource 502 are depicted as display module 506, evaluation data module 508, rating module 510, missed test identifier module 512, under-focused test identifier module 514, and improvement priority module 516. Display module 506 represents program instructions that when executed by processing resource 504 may perform any of the functionalities described above in relation to display engine 202 of FIG. 2. Evaluation data module 508 represents program instructions that when executed by processing resource 504 may perform any of the functionalities described above in relation to evaluation data engine 204 of FIG. 2. Rating module 510 represents program instructions that when executed by processing resource 504 may perform any of the functionalities described above in relation to rating engine 206 of FIG. 2. Missed test identifier module 512 represents program instructions that when executed by processing resource 504 may perform any of the functionalities described above in relation to missed test identifier engine 302 of FIG. 3. Under-focused test identifier module 514 represents program instructions that when executed by processing resource 504 may perform any of the functionalities described above in relation to under-focused test identifier engine 304 of FIG. 3. Improvement priority module 516 represents program instructions that when executed by processing resource 504 may perform any of the functionalities described above in relation to improvement priority engine 306 of FIG. 3.

Operation

Figure 6:
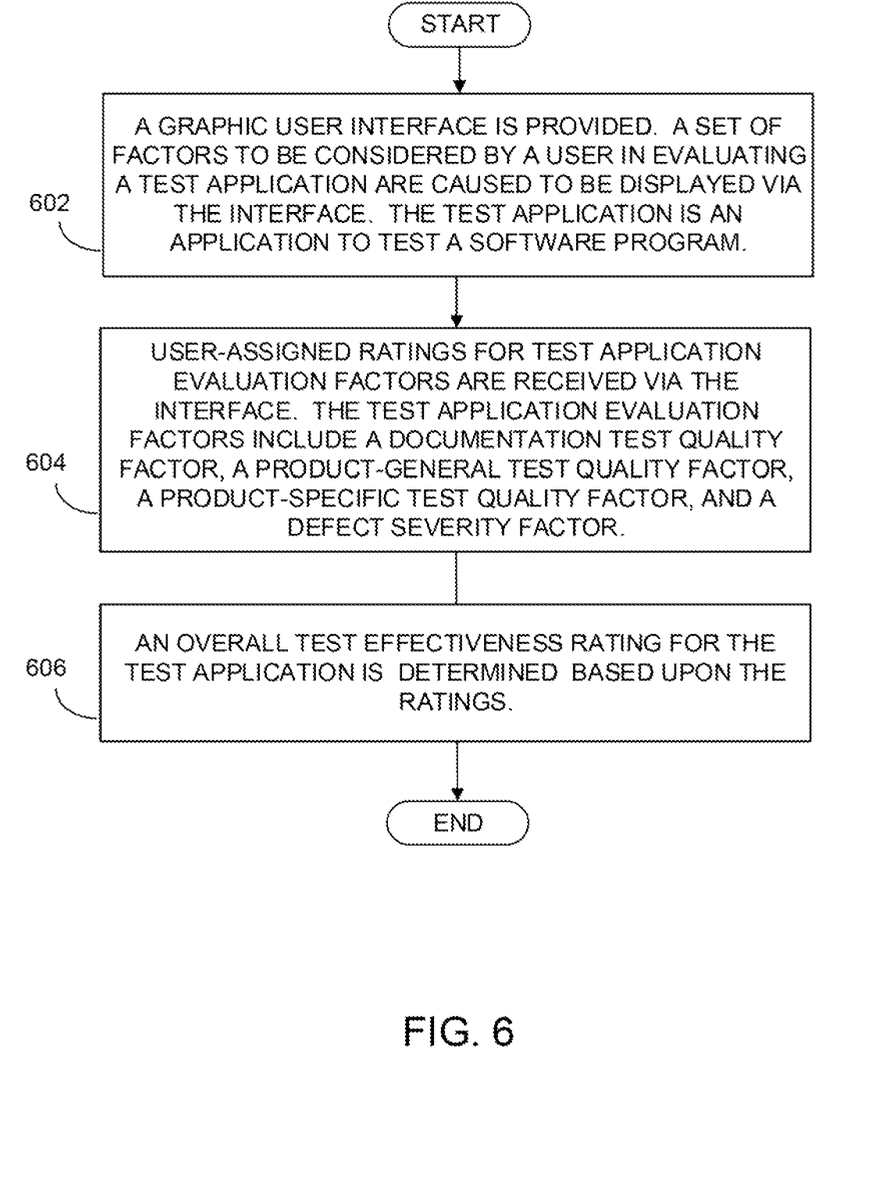
FIG. 6 is a flow diagram depicting steps taken to implement an example of determination of test application effectiveness.

FIG. 6 is a flow diagram of steps taken to implement a method for determination of test application effectiveness. In discussing FIG. 6, reference may be made to the components depicted in FIGS. 2 and 5. Such reference is made to provide contextual examples and not to limit the manner in which the method depicted by FIG. 6 may be implemented. A graphic user interface is provided and a set of factors to be considered by a user in evaluating a test application are caused to be displayed via the interface. The test application is an application to test a software program (block 602). Referring back to FIGS. 2 and 5, display engine 202 (FIG. 2) or display module 506 (FIG. 5), when executed by processing resource 504, may be responsible for implementing block 602.

User-assigned ratings for test application evaluation factors are received via the interface. The rated test application evaluation factors include a documentation test quality factor, a product-general test quality factor, a product-specific test quality factor, and a defect severity factor (block 604). Referring back to FIGS. 2 and 5, evaluation data engine 204 (FIG. 2) or evaluation data module 508 (FIG. 5), when executed by processing resource 504, may be responsible for implementing block 604.

An overall test effectiveness rating is determined for the test application in consideration of the ratings for the documentation test quality factor, the product-general test quality factor, the product-specific test quality factor, and the defect severity factor (block 606). Referring back to FIGS. 2 and 5, rating engine 206 (FIG. 2) or rating module 510 (FIG. 5), when executed by processing resource 504, may be responsible for implementing block 606.

Illustrative Example

FIGS. 7, 8A, 8B, 8C, 9A, 9B, and 10 illustrate an example of determination of test application effectiveness by system 102. Beginning at FIG. 7, in an example, test application effectiveness determination system 102 (FIGS. 2 and 3) provides a graphic user interface 702 and causes a display 704 via the interface 702 of a set of factors 706 to be considered by a user in evaluating a subject test application 700 for testing a software program. System 102 receives via the interface 702 evaluation data 708 for the subject test application 704, the evaluation data including user-assigned ratings 710 for documentation test quality factors 712, for product-general test quality factors 714, for product-specific test quality factors 716, and for a defect severity factor 718. In this example of FIGS. 7, 8A, 8B, 8C, 9A, 9B, and 10, a rating for a product-general test quality factor 714 or a product-specific test quality factors 716 may be referred to as a "product factor", and ratings for the product-general test quality factors 714 or the product-specific test quality factors 716 collectively (in whole or in part) may be referred to as "product factors" 720.

Figure 7:
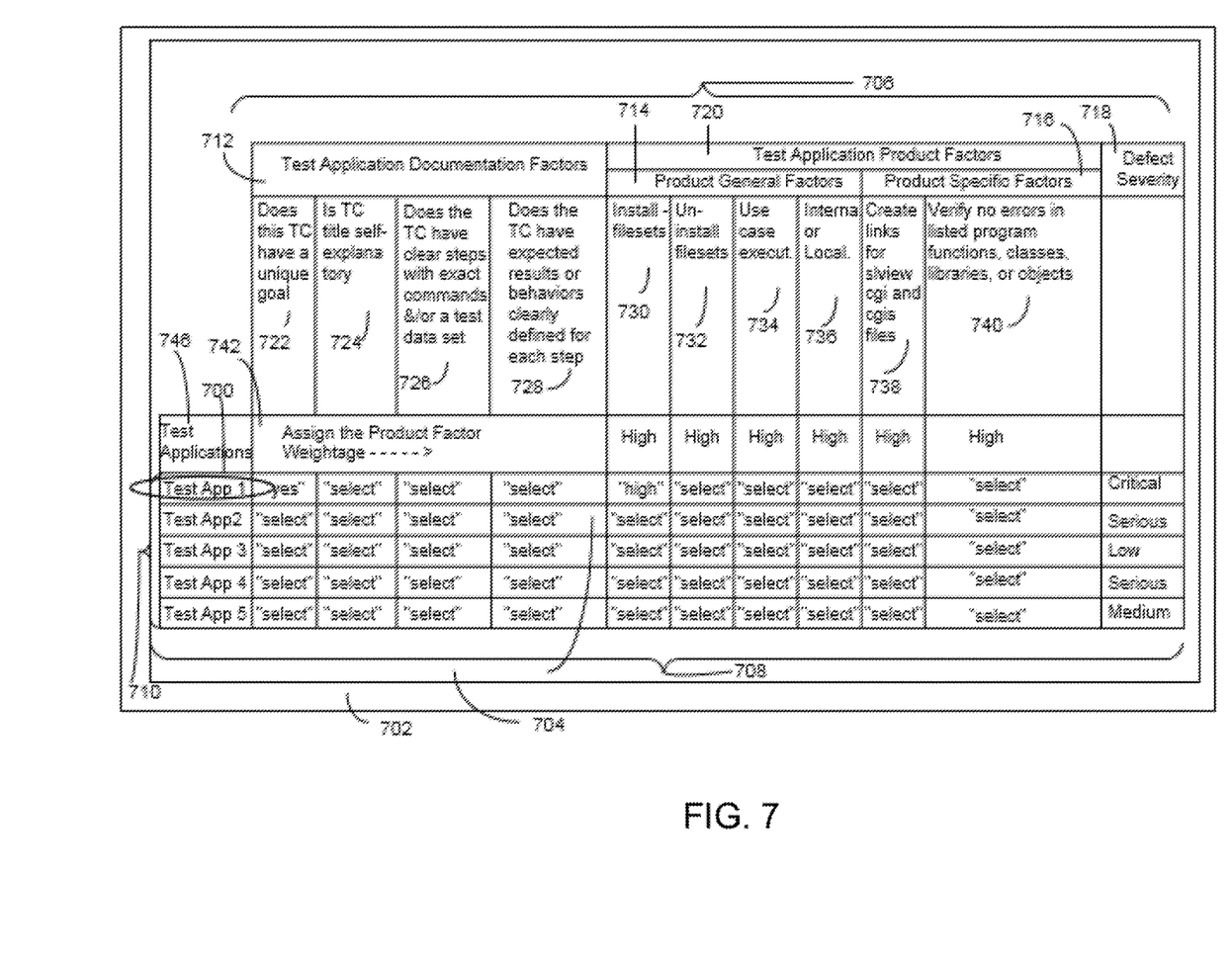
FIGS. 7, 8A, 8B, 8C, 9A, 9B, and 10 illustrate an example of determination of test application effectiveness.

The user-provided rating for the documentation test quality factor 712 may be or include an evaluation of an extent to which the test application documentation includes at least one of a stated goal 722 for the test application, an explanatory title 724, stated test steps 726, and stated expected test results or behaviors 728.

The user provided ratings for the product-general test quality factor 714 may be or include an assessment of the test application testing an installation task 730, an uninstallation task 732, a use case task 734, and/or an internationalization or localization task 736. The user-provided ratings for the product-specific test quality factors 716 may be or include an assessment of the test application testing a named document 738, a named program function, a named program class, a named program library, and/or a named program object 740.

The user-provided rating for the defect severity factor 718 may be or include an assessment (e.g., chosen among provided options of "Critical", "Serious", "Medium", and "Low") of significance of the anticipated impact of to a user or stakeholder if the test application indicates an unsatisfactory behavior of the evaluated software program. In an example, the user-assigned rating for the defect severity factor 718 may indicate the anticipated impact to developer users, production team users, and/or production stakeholders for the software program. Further, in this example, system 102 receives, via the interface 702, a user-assigned weightage rating 742 for the product factors 720 (the product-general test quality factors 714 and the product-specific test quality factors 716).

Continuing with this example, system 102 determines, based upon the ratings for the documentation test quality factors 712, the product-general test quality factor 714, the product-specific test quality factors 716, and the defect severity factor 718, an overall test effectiveness rating 900 (FIG. 9A) for the subject test application.

Figure 8A:
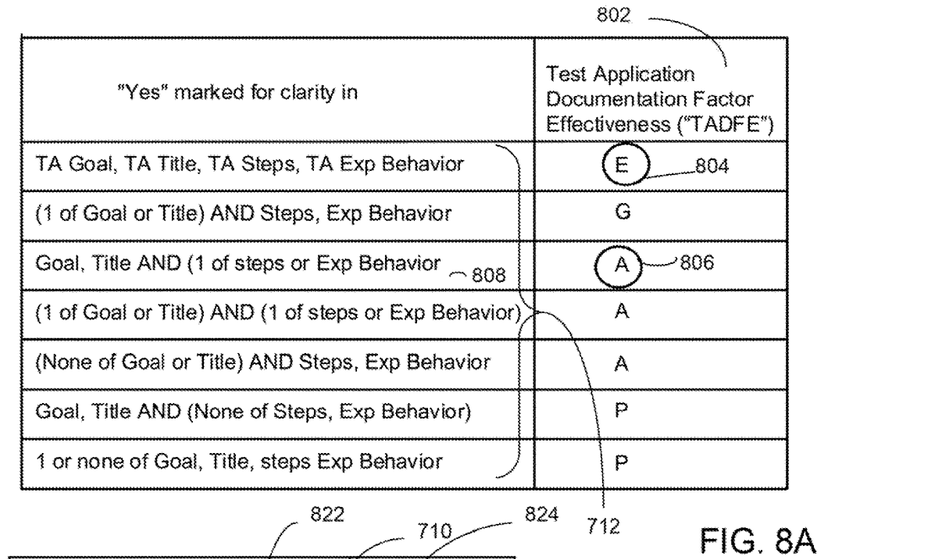

Moving to FIG. 8A, in this example in determining the overall test effectiveness rating 900 (FIG. 9A) system 102 derives a "Test Application Documentation Factor Evaluation" or "TADFE" 802 score or rating based upon specified combinations of user-provided documentation test quality factors 712. For instance, a TADFE of "E" ("Excellent") 804 may be derived if the test application has all four documentation test quality factors ("TA Goal", "TA Title", "TA Steps", and "TA Exp Behavior") marked as "yes" by a user. Alternatively, in this example if a user has marked "yes" for "Goal", "Title" and only one of the categories "TA Steps" and "TA Expected Behavior", then the TADFE may be derived as "A" ("Average") 806.

Figure 8B:
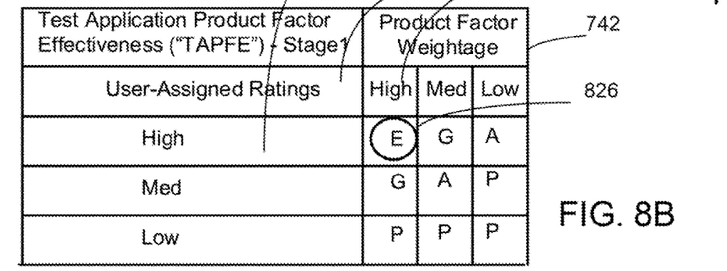
Figure 8C:
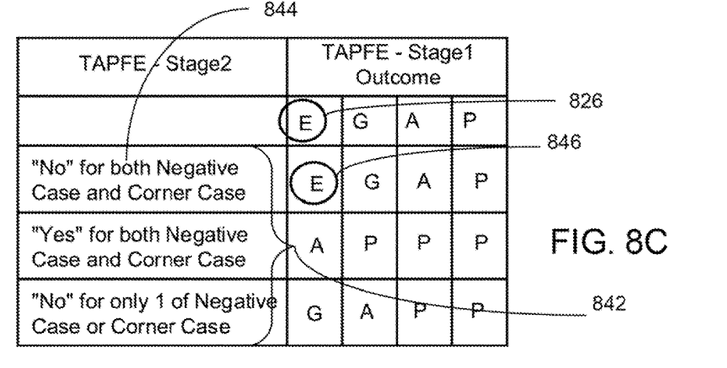

Moving to FIGS. 8B and 8C, in this example in determining the overall test effectiveness rating 900 (FIG. 9A) system 102 derives a "Test Application Product Factor Evaluation" ("TAPFE") score or rating in two stages. In "Stage 1" (at FIG. 9A), system 102 considers, for each product factor 720 (FIG. 7), combinations of the user-assigned weightage 742 and the user-assigned ratings 710 for the product factors (the product-general test quality factors 714 (FIG. 7) plus the product-specific test quality factors 716 (FIG. 7)). Continuing at FIG. 8B, if the user-assigned rating is "High" 822 for at least one product factor and the product factor weightage is also "High" 824, then Stage1 output is "E" ("Excellent") 826.

In this example, system 102 considers in Stage 2 (at FIG. 9B) the combination of Stage1 "Excellent" output 826 and a user-assigned designation or designations among the test application case-type set 842 that includes "Negative Case" and "Corner Case." In this example the test application is user-marked as "No" 844 for both "Negative" and "Corner" cases, such that the Stage 2 TAPFE output is also "E" ("Excellent") 846.

Figure 9A:
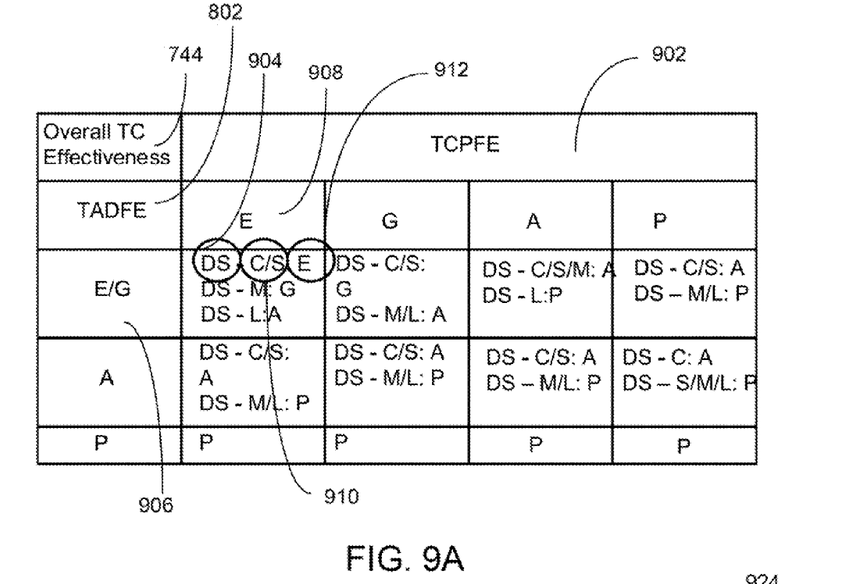

Moving to FIG. 9A, and continuing with this example, system 102 determines for the subject test application an overall test effectiveness rating 900 considering the combination of TADFE 802, TAPFE 902, and defect severity data 904. In this example of FIG. 9A, if the derived TADFE 802 for a test application is "Excellent" or "Good" 906, the derived TAPFE is "Excellent" 908, and the user-assigned defect severity rating is "Critical" or "Serious" 910, system 102 may determine that the overall effectiveness rating 900 for the test application is "Excellent" 912.

Figure 9B:
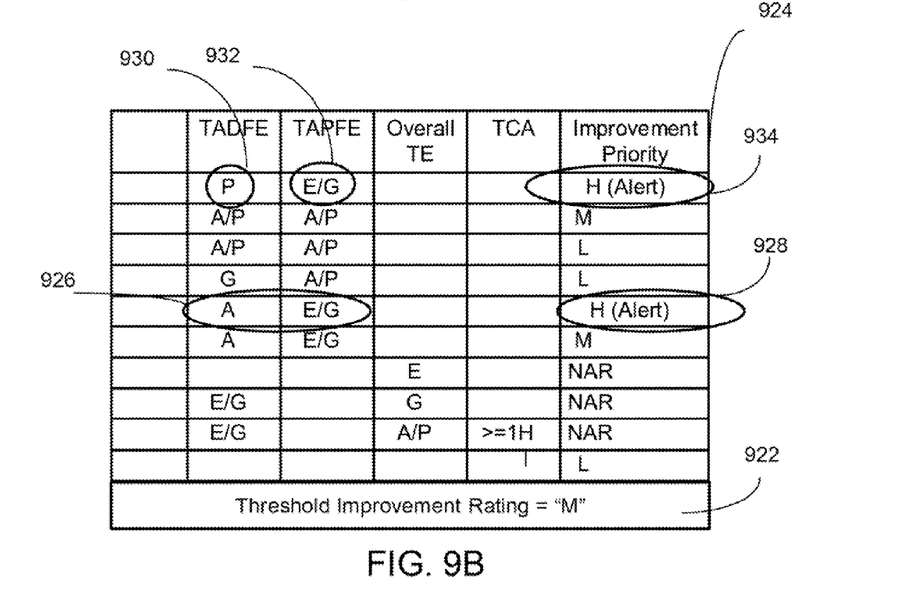

Moving to FIG. 9B, and continuing with this example, system 102 may access a threshold improvement priority rating 922 of "M" ("Medium"). In this example, system 102 may determine an improvement priority rating 924 based upon identifying a predetermined combination, e.g., at 926, of at least two of the user-assigned documentation test quality factor rating, the user-assigned product-general test quality factor rating, the user-assigned product-specific test quality factor rating, the user-assigned defect severity factor rating, and the determined overall test effectiveness rating 900. In this example, system 102 provides a recommendation or alert 928 responsive to determining the improvement priority rating exceeds the threshold rating. For instance, if a test application has TADFE as "Poor" 930 and TAPFE as "Excellent" or "Good" 932, then system 102 may determine the improvement priority is "High" 934 and exceeds the "Medium" threshold improvement rating 922. In this instance, the "High" improvement priority determination suggests the test application is aiming at important functionality, yet the "Poor" test application documentation factor rating could lead to inappropriate or partial testing and hence possible defect slips.

Figure 10:
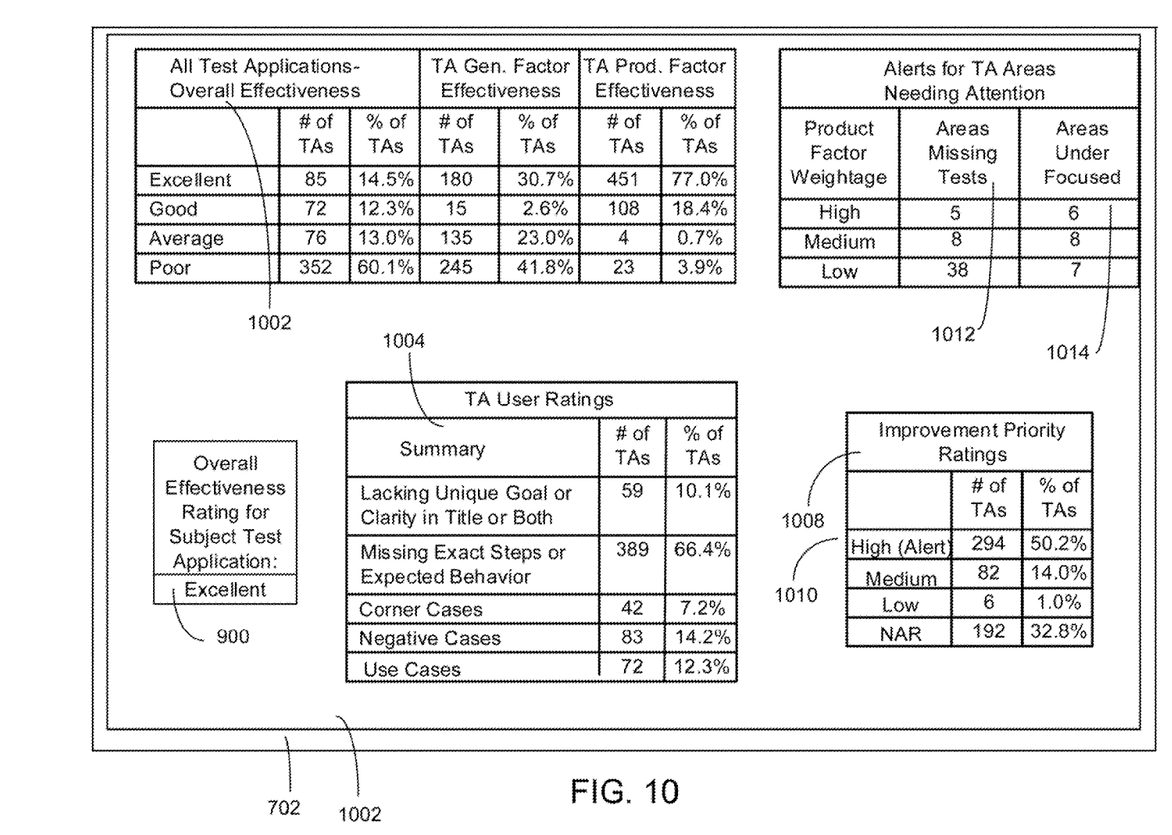

Moving to FIG. 10, and continuing with this example, system 102 may cause a display 1002 of the overall test effectiveness rating 900 for the subject test application (in this example, "Excellent") via the graphic user interface 702. In the example of FIG. 10, the display 1002 of the determined overall test effectiveness rating 900 is in the form of an test application dashboard, and also includes a summary 1004 of the overall effectiveness ratings for the entire set of test applications (Test Applications 1-5. 746 FIG. 7), and a summary 1006 of the number of test applications failing under categories such as "Lacking Unique Goal, or Clarity in Title, or Both", "Missing Exact Steps", "Expected Behavior", "Corner Cases", "Negative Cases", and "Use Cases." In this example, system 102 may also provide via the display determined improvement priority ratings 1008, including an alert 1010 where the improvement priority rating exceeds a threshold rating.

Continuing with FIG. 10 and this example, system 102 may access data indicative of evaluation of the entire set test applications (Test Applications 1-5, 746 FIG. 7) relating to the software program, and provide a missing test recommendation or alert 1012 responsive to determining a product test factor 720 (a product-general test quality factor 714 or a product-specific test quality factor 716) (FIG. 7) is not tested by any of the set of test applications 746. System 102 may additionally access data indicative of evaluation of the entire set test applications relating to the software program, and provide an under-focused area recommendation or alert 1014 responsive to determining that a product test factor 720 is not directly tested by one of the set of test applications (e.g., none of the user-assigned ratings 710 (FIG. 8) for the product factor is a "High" rating or other rating above the median among rating options. Thus, a test team may infer from this dashboard and decide where attention is required based on the test applications' distribution to these categories.

Any specific determination rule or formula presented at FIG. 7, 8A, 8B, 8C, 9A, 9B, or 10 is presented as an example and is not intended to be exclusive. It is contemplated that system 102 may utilize other determination rules or formulas in evaluating test application effectiveness.

CONCLUSION

FIGS. 1, 2, 3.4, 5, 6, 7, 8A, 8B, 8C, 9A, 9B, and 10 aid in depicting the architecture, functionality, and operation of various examples. In particular, FIGS. 1, 2, 3, 4, and 5 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Examples can be realized in any memory resource for use by or in connection with processing resource. A processing resources is an instruction execution system such as a computer/processor based system or an ASIC Application Specific Integrated Circuit) or other system that can fetch or obtain instructions and data from computer readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been shown and described with reference to the foregoing examples. It is to be understood, however, that other forms, details and examples may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A system for evaluating test application effectiveness, comprising:
 a display engine, to provide a graphic user interface and cause a display of a plurality of factors to be considered by a user in evaluating a test application via the interface, the test application to test a software program;
 an evaluation data engine, to receive via the interface user-assigned ratings for test application evaluation factors including a documentation test quality factor, a product-general test quality factor, a product-specific test quality factor, and a defect severity factor; and
 a rating engine to determine, based upon the rating, an overall test effectiveness rating for the test application.

2. The system of claim 1, wherein the rating engine is to cause a display of the overall test effectiveness rating via the graphic user interface.

3. The system of claim 1, wherein the rating for the documentation test quality factor includes an evaluation of an extent to which the test application documentation includes at least one of a stated goal for the test application, an explanatory title, stated test steps, stated expected test results, and stated expected test behaviors.

4. The system of claim 1, wherein rating for the product-general test quality factor includes an assessment of the test application testing of at least of one of an installation task, an uninstallation task, a use case task, an internationalization task, and a localization task.

5. The system of claim 1, wherein the rating for the product-general test quality factor includes an assessment of the test application testing at least one of a document file, a log file, and a configuration file.

6. The system of claim 1, wherein the rating for the product-specific test quality factor includes an assessment of the test application testing at least one of a named document, a named program function, a named program class, a named program library, and a named program object.

7. The system of claim 1, wherein the rating for the defect severity factor includes an assessment of impact to a user or stakeholder if the test application indicates an unsatisfactory behavior of the software program.

8. The system of claim 1, wherein the evaluation data engine is to receive via the interface, a user-assigned weightage rating for the product-general test quality factor and the product-specific test quality factor, and wherein the rating engine is to determine the overall test effectiveness rating based upon the weightage rating.

9. The system of claim 1, wherein the evaluation data engine is to receive via the interface, a user-assigned designation of at least one of a positive case, negative case, boundary case, edge case, and corner case, and the overall test effectiveness rating is determined based upon the designation.

10. The system of claim 1, wherein the test application is a subject test application, and further comprising a missed test identifier engine, to access data indicative of evaluation of a plurality of test applications relating to the software program, the plurality including the subject test application, and to provide a recommendation or alert responsive to determining a product-general test quality factor or a product-specific test quality factor is not tested by any of the plurality of test applications.

11. The system of claim 1, wherein the test application is a subject test application, and further comprising an underfocused test identifier engine, to access data indicative of evaluation of a plurality of test applications relating to the software program, the plurality including the subject test application, and to provide a recommendation or alert responsive to determining that a product-general test quality factor or a product-specific test quality factor is not directly tested by one of the plurality of test applications.

12. The system of claim 1, further comprising an improvement priority engine to determine an improvement priority rating based upon at least two of the user-assigned documentation test quality factor rating, the user-assigned product-general test quality factor rating, the user-assigned product-specific test quality factor rating, the user-assigned defect severity factor rating, and the determined overall test effectiveness rating, and to provide a recommendation or alert responsive to determining the improvement priority rating exceeds a threshold rating.

13. A memory resource storing instructions that when executed cause a processing resource to implement a system to evaluate effectiveness of a test application, the instructions comprising:
a display module, to provide a graphic user interface and cause a display of a documentation test quality factor, a product-general test quality factor, a product-specific test quality factor, and a defect severity factor to be considered by a user in evaluating a test application via the interface, the test application to test a software program;
an evaluation data module, to receive via the interface, as test application evaluation data for the application, user-assigned ratings for the documentation test quality factor, the product-general test quality factor, the product-specific test quality factor, and the defect severity factor,
wherein the documentation test quality factor includes at least one of a stated goal for the test application, an explanatory title, stated test steps, and stated expected test results or behaviors, the product-general test quality factor includes at least one of an installation task, an uninstallation task, a use case task, an internationalization, and a localization task, the product-specific test quality factor includes at least one of a code specifying at least one of a named document, a named program function, a named program class, a named program library, and a named program object, and defect severity factor includes an impact to a user or stakeholder if the software program fails upon execution of the test application; and
a rating module, to determine, in consideration of the ratings, an overall test effectiveness rating for the test application and cause a display of the ratings via the interface.

14. The memory resource of claim 13, wherein the rating for the product-specific test quality factor includes an assessment of the test application testing a specified code set of the test application.

15. A test application evaluation method, comprising:
providing a graphic user interface and causing a display via the interface of a plurality of factors to be considered by a user in evaluating a subject test application for testing a software program;
receiving via the interface evaluation data for the subject test application, the evaluation data including user-assigned ratings for a documentation test quality factor, a product-general test quality factor, a product-specific test quality factor, and a defect seventy factor;
determining, based upon the ratings, and providing via the interface an overall test effectiveness rating for the subject test application;
determining an improvement priority rating based upon at least two of the user-assigned documentation test quality factor rating, the user-assigned product-general test quality factor rating, the user-assigned product-specific test quality factor rating, the user-assigned defect severity factor rating, and the determined overall test effectiveness rating, and providing a recommendation or alert responsive to determining the improvement priority rating is above a threshold rating;
accessing data indicative of evaluation of a plurality of test applications for testing the software program, the plurality including the subject test application; and
providing a recommendation or alert responsive to determining, that a product-specific test quality factor is not directly tested by one of the plurality of test applications.

* * * * *